March 31, 1959 C. K. COOK ET AL 2,879,816
CHUCK ASSEMBLY FOR VENEER CUTTING LATHES
Filed July 2, 1956 3 Sheets-Sheet 1
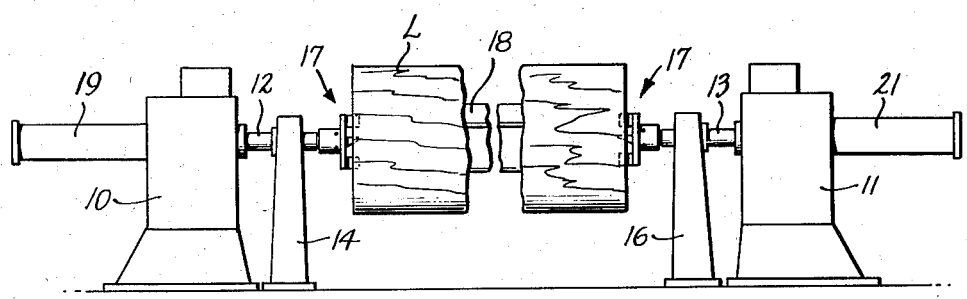
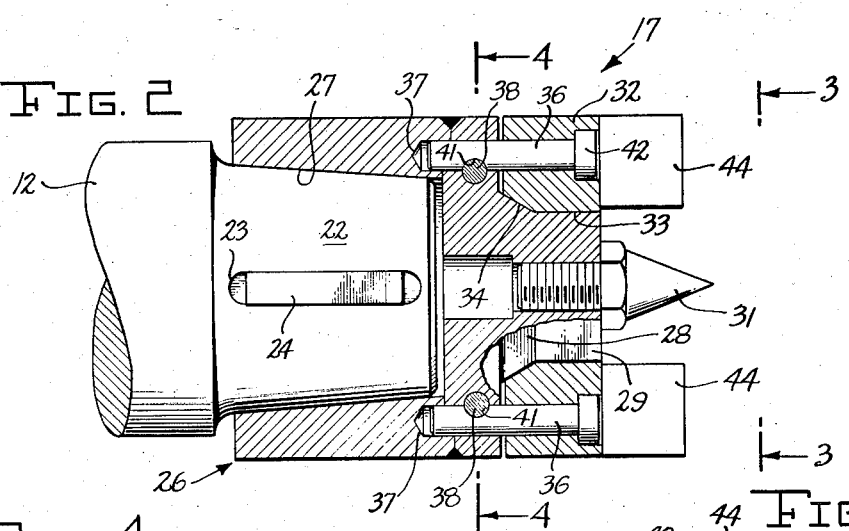
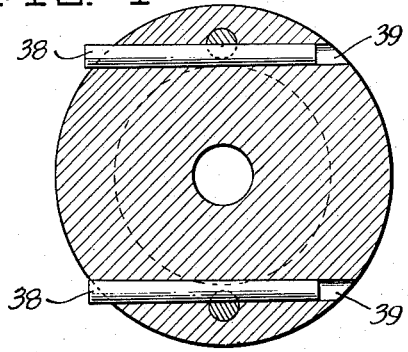
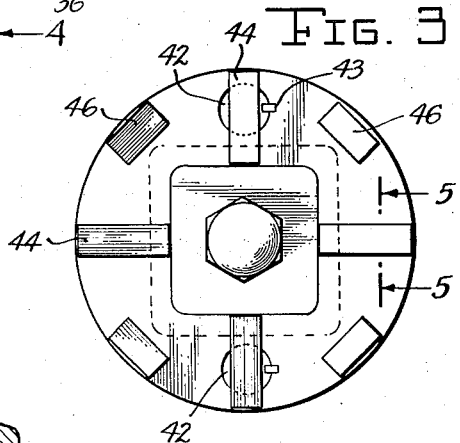
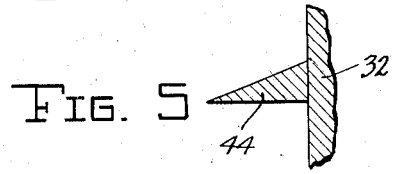
INVENTORS
CHESTER K. COOK
GEORGE F. HITT
BY Townsend and Townsend
ATTORNEYS.

March 31, 1959  C. K. COOK ET AL  2,879,816
CHUCK ASSEMBLY FOR VENEER CUTTING LATHES
Filed July 2, 1956  3 Sheets-Sheet 2
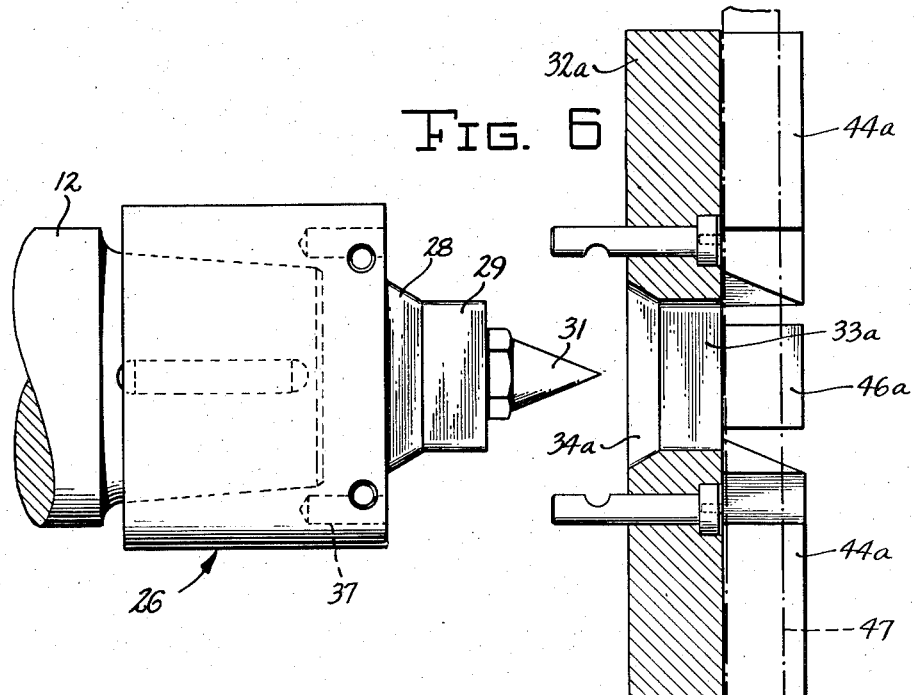
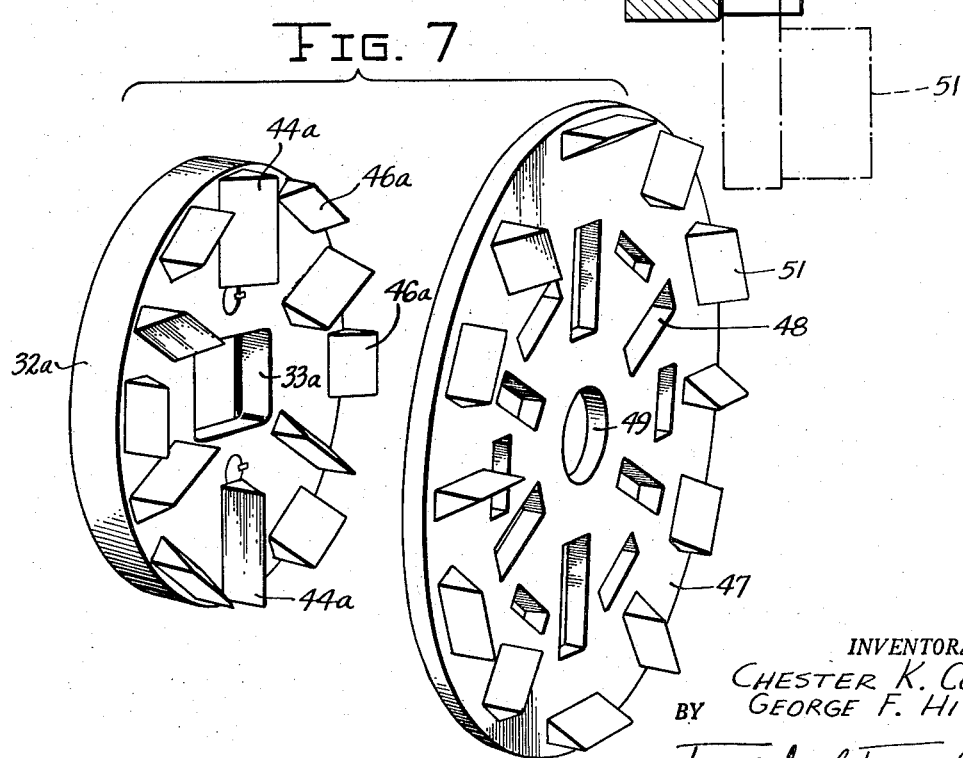
INVENTORS
CHESTER K. COOK
BY  GEORGE F. HITT
Townsend and Townsend
ATTORNEYS March 31, 1959   C. K. COOK ET AL   2,879,816
CHUCK ASSEMBLY FOR VENEER CUTTING LATHES
Filed July 2, 1956   3 Sheets-Sheet 3
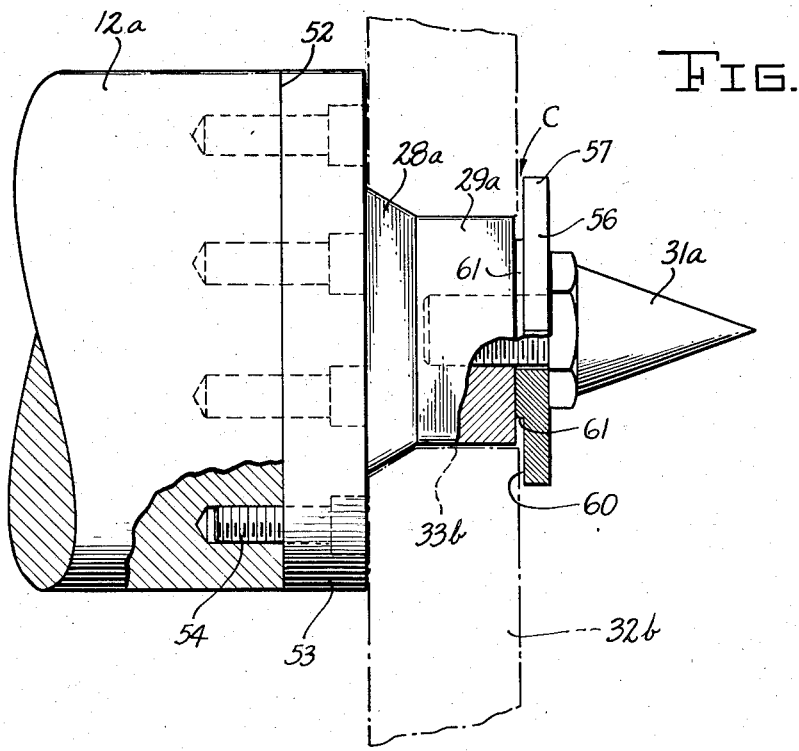
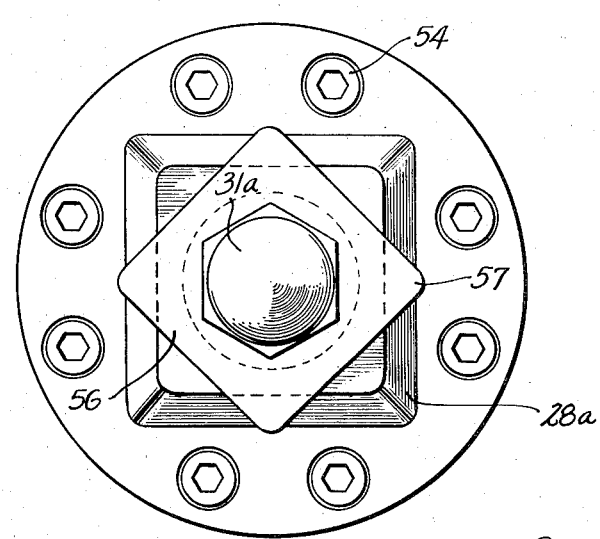
INVENTORS
CHESTER K. COOK
BY   GEORGE F. HITT
Townsend and Townsend
ATTORNEYS United States Patent Office 2,879,816
Patented Mar. 31, 1959

2,879,816

CHUCK ASSEMBLY FOR VENEER CUTTING LATHES

Chester K. Cook and George F. Hitt, Arcata, Calif.

Application July 2, 1956, Serial No. 595,545

3 Claims. (Cl. 144—209)

This invention relates generally to veneer-cutting machines or lathes and pertains particularly to an improved spur chuck or face plate assembly for supporting logs from which veneer is peeled.

In the construction of veneer-cutting machines it is common practice to provide the rotary spindles or the head and tail stock assemblies thereof with means whereby spurred face plates of different sizes or diameters can be removably mounted thereon to accommodate correspondingly different sizes of logs; either different initial sizes of logs, or logs in different stages of being peeled.

Large logs necessarily require relatively larger and heavier chucks to adequately support them in the peeling operation. However, as the diameter of the log constantly decreases to approach the diameter of the face plate, the operation must be stopped to allow a change-over to a smaller face plate or chuck in order that peeling can be continued and thus make for efficient utilization of the material in the log. The change-over must be made without undue delay since a partly peeled log, if allowed to stand, will rapidly dry out and check, and thus be rendered useless for anything except saw mill cuts which have a value considerably less than that of veneer.

It has been common practice to mount spur chucks on the rotary spindles of veneer machines by means of a Morse taper—usually in conjunction with a keyway. While this has been found to provide adequate support for the chucks once they are in place, great difficulty has been encountered in removing them because of the binding effect of the tapered connection whenever a change-over of chucks becomes necessary. First of all, chucks of this type are very heavy and difficult to handle and this in itself adds to the difficulties encountered in releasing them from the powerful binding grip of the tapered connection between chuck and spindle.

A principal object of this invention, therefore, is to provide an improved chuck assembly having easily detachable spur or face plates of different sizes to accommodate varying sizes of logs.

A further object of this invention is to provide an improved chuck construction including first and second modifications thereof, each having a separate spindle adaptor for semi-permanent mounting upon the standard tapered spindle of a veneer cutting machine; the said adaptor constructed to receive and support any of several sizes of face plates which are quickly and easily attached or detached therefrom.

Still another object of this invention is to provide means whereby a cap plate of large diameter may be mounted upon the face side of one of the aforementioned face plates for simultaneous support therewith upon a single spindle to accommodate the largest of logs handled.

Numerous other objects and advantages of the present invention will become apparent upon reading the following specification and referring to the accompanying drawings in which similar characters of reference represent corresponding parts in each of the several views.

In the drawings:

Fig. 1 is an elevational view of a veneer-cutting machine employing improved chuck assemblies constructed in accordance with the principles of this invention.

Fig. 2 is an enlarged sectional view of a chuck assembly having a detachable face plate of minimum size.

Fig. 3 is an end view in the plane of lines 3—3 in Fig. 2.

Fig. 4 is a sectional view taken as indicated by lines 4—4 of Fig. 2.

Fig. 5 is an enlarged sectional view taken as indicated by lines 5—5 in Fig. 3.

Fig. 6 is a side elevational view of a chuck assembly in exploded relation with an intermediate size primary face plate shown in section; and also showing by means of phantom lines how a secondary cap plate of larger diameter may be over-laid and supported by the intermediate sized face plate.

Fig. 7 is a perspective view, in exploded relation, of the face plate and cap plate shown in the right hand side of Fig. 6.

Fig. 8 is a side elevational view, partly in section, of a modified form of the invention wherein a bolted connection is used to secure the spindle adaptor to the spindle, and alternate means are provided to lock the face plates upon the spindle adaptor.

Fig. 9 is an end view of the adaptor shown in Fig. 8.

Referring to the drawings, there is somewhat schematically illustrated in Fig. 1 a veneer-cutting machine of conventional design having a headstock 10 and a tailstock 11 both provided with a source of power (not shown) for rotatively driving their respectively associated live spindles 12 and 13. Each of the spindles 12 and 13 is given added support by means of steady-rests 14 and 16 respectively. A pair of improved chuck assemblies 17, which constitute the principal subject of this invention, is shown mounted on the opposed ends of the spindles 12 and 13 for supporting a log L therebetween. The log-peeling knife assembly 18 situated at one side of the log L may be considered to be of standard construction and operation and well known in the art and is not, therefore, further described.

As in most, if not all, machines of this general type, means are provided for axially driving (i.e., extending and retracting) the spindles 12 and 13 and their associated spur chucks into wood piercing engagement with the ends of the log, and this may be accomplished as by means of hydraulic cylinders such as 19 and 21 as is also well understood by those skilled in the art.

As shown in Fig. 2, the end portion of a standard spindle such as 12 is generally cut with a reduced section defining usually a Morse taper 22 upon which is also cut a keyway 23 for retaining a key 24.

The chuck assembly 17 which is mounted upon the spindle 12 is comprised, in part, of a spindle-supported member such as the spindle adaptor 26, bored out as at 27 with a female complementary taper to seat and bind tightly upon the taper 22 of the spindle 12. This tapered connection provides a means for semi-permanently mounting the adaptor 26 of the spindle 12. The fore part of the spindle adaptor 26 is formed with a reduced stud-like portion defining an axially projecting, truncated square based pyramidal section 28, terminating in an outwardly projecting, integral, square prism-shaped boss 29. The square boss 29 of the adaptor 26 is bored out and threaded to receive a center 31.

The fore part of the spindle adaptor 26 is designed to support any of several sizes of spur or face plates such as indicated at 32 in Figs. 2 and 3, and at 32a in Figs. 6 and 7. The face plates 32 and 32a have identically milled central square-cut apertures 33 and 33a beveled at their inner sides as at 34 and 34a respectively to telescope over boss 28 with the outwardly flared beveled surfaces 34 or 34a seated against the aforementioned truncated pyramidal section 28 of the adaptor 26. It is noted that the thickness of each apertured face plate approximately equals the axially projected length of the pyramidal section 28 and boss 29.

Since it has been found that it is desirable to peel a log down to about eight inches minimum diameter before discarding it for mill cut lumber, this determines the smallest size of face plate and, as shown in Fig. 2, the diameter of the smallest face plate 32 may be about the same as the diameter of the spindle adaptor 26 upon which the face plates are to be mounted. Other convenient diametral sizes of face plates have been found to be 12, 16 and 24 inches, although it is obvious that other sizes are possible.

To retain the face plate 32 (see Fig. 2) in position on the spindle adaptor 26, a pair of projecting pin studs 36 are provided in the face plate 32 to match and be inserted into a pair of drilled holes 37 in the adaptor 26. The pin studs 36 are locked into place in the adaptor 26 by a pair of taper pins 38 driven into tapered holes 39 (see Fig. 4) transversely drilled into the adaptor 26 and into interlocking engagement with an associated notch 41 formed in each of the pin studs 36. This construction permits easy and rapid removal of the face plates from the adaptor 26 since it is necessary only to punch out the taper pins 38 to release the pin studs 36 and the face plate 32 from the adaptor 26. The mating seating surfaces defined by the truncated pyramidal section 28 and the squared boss section 29 are freely sliding surfaces and cause no bind between respective parts.

The pin studs 36 are in effect fixed to the face plate 32 and have their heads 42 countersunk into the face side of the face plate. The heads 42 are prevented from rotation by means of keys 43 (see Fig. 3).

The front or outer surface of the face plate 32 is provided with a plurality of wedge-like log-piercing elements or dogs 44 and 46, half of which are aligned radially (i.e., dogs 44) and the other half are aligned circumferentially (i.e., dogs 46). This is to provide maximum gripping effect upon the ends of the log. The dogs 44 and 46 are welded into place upon the face plate 32. As shown in Fig. 3, two of the dogs 44 overlie the heads 42 of the pin studs 36 and thus prevent axial displacement of the latter.

The construction of the face plate 32a shown in Figs. 6 and 7 is similar to the face plate 32 shown in Figs. 2 and 3. However, the diameter of the former is about twice that of the latter.

Means for increasing the effective diameter of a chuck is shown in Figs. 6 and 7 wherein a cap plate 47 of relatively large diameter is provided with a plurality of slots or apertures 48 which are adapted to receive the projecting dogs 44a and 46a of the face plate 32a (see Fig. 6). A central aperture 49 in the cap plate 47 is for accommodating the center 31 of the adaptor 26.

The cap plate 47 is also provided with a plurality of wedge-like log-piercing elements or dogs 51 which are arranged around the outer edge portion thereof.

In operation, a relatively large diameter log to be peeled may be lowered by suitable winch means (not shown) into proper position between the opposed chuck assemblies 17, whereupon the spindles 12 and 13 and their associated chuck assemblies are driven into the ends of the log by means of the cylinders 19 and 21. This causes the apertured cap plate 47 to adequately bind upon the dogs 44a and 46a so as to prevent relative play or rotation between the cap plate 47 and the face plate 32a (or 32b). Thus the log is held firmly for the peeling operation. The peeling operation may then be started and can continue until the diameter of the log is reduced almost to the diameter of the cap plate 47. Then the peeling operation must be interrupted to permit withdrawal of the cap plates 47. This is accomplished by simply retracting the spindles 12 and 13 as explained hereinbefore. At least one end of the log will then be completely released and will perhaps drop somewhat, thus releasing the opposite end of the log also.

After the cap plates 47 are removed from the face plates 32a (or 32b), the log is again inserted into the machine as before. The original center indentations as caused by the centers 31 being driven into the ends of the log will serve as guides in re-centering the log into proper position. Peeling may then be continued until the diameter is further reduced to almost the diameter of the intermediate sized face plate. Then again it becomes necessary to stop the machine and release the log—but this time replacing the face plate 32a (or 32b) with a smaller one such as perhaps the minimum sized plate 32, whereupon the final peeling operation may be completed.

A modified form of the invention is illustrated in Figs. 8 and 9 wherein a spindle member 12a defines a perpendicular end face 52 upon which is semi-permanently mounted a spindle adaptor 53 secured thereto by means of a plurality of bolts 54. The adaptor 53 is provided with a reduced portion defining an axially projecting pyramidal section 28a and a square boss 29a which are identical in construction to corresponding parts of the previously described spindle adaptor 26. However, the method of locking a face plate such as 32b upon the modified adaptor 53 is simplified and is accomplished by the use of a square washer-like retainer plate 56 which is revolvably retained under the enlarged hexagonal head of the center 31a. The outer periphery or contour of the retainer plate 56 is of the same square shape and size as the boss 29a so that when the two are rotatively aligned, their exterior surfaces are coplanar and thus allow the square cut aperture 33b of face plate 32b to be slipped over the retainer plate 56 and into seated engagement with the adaptor 53 as will be obvious. Then the retainer plate 56 is rotated 45° to a position as shown in Figs. 8 and 9 so that its corner portions 57 will overlie the face plate 32b. In this position the retainer plate 56 may be firmly clamped against boss 29a by tightening the center screw 31a and thus lock the face plate 32b into position upon the adaptor 53. Conversely it is apparent that removal of a face plate 32b may be accomplished with equal ease since it is necessary only to slightly loosen the center 31a and align the retainer 56 with aperture 33b of the face plate to permit axial withdrawal of the face plate 32b from boss 29a without interference from the retainer plate.

It is also noted that the inner surface 60 of the retainer plate is machined to define an inwardly projecting spacer hub 61 of smaller diameter than the cross-section of boss 29a. Spacer hub 61 when screwed tightly against the end of boss 29a (through tightening of center 31a) functions to maintain a slight clearance indicated at C between the inner surfaces 60 of the retainer plate and the outer surfaces of the face plate 32b. This clearance between the retainer and face plates is desirable in that it permits slight relative canting movement between these members which may occur when the dogs of the face plate are forcefully driven and embedded in the end of a log that is not perfectly square-cut. In such an instance, the face plate will have a tendency to align itself parallel with the end-cut surface of the log and cause the face plate to cant or tilt slightly out of perpendicular alignment with the axis of the spindle and out of parallel alignment with the plane of the retainer plate. By providing the clearance C, the slight canting of the face plate will not exert direct pressure against any part of the retainer plate which would cause bending or deformation of the latter due to the fact that the retainer plate is made of much thinner and lighter gauge material than the relatively thicker and sturdier face plate.

Operation of the modified spindle adaptor 53 with its associated face plates attachable thereto may be considered in other respects not above mentioned substantially the same as the operation of the first described embodiment of the invention in the peeling of logs of varying diameters.

Occasionally, and when it is necessary to peel exceptionally long logs, as for example 10-12 feet, it is necessary to remove the steady rests 14 (which are usually spaced apart about 10 feet) to accommodate the longer logs between opposed chuck assemblies. In such instances, the spindles are axially retracted to positions closely adjacent the head and tail stocks. An advantage of the modified adaptor 53 as shown in Figs. 8 and 9 is that its maximum outside diameter is no more than the end of the spindle to which it is attached. Hence, either spindle with an adaptor 53 secured thereto can be axially retracted through the spindle bearing of a steady rest without requiring removal of the adaptor from the end of the spindle. On the other hand, the adaptor 26 of the first described embodiment of the invention being of larger outside diameter than the spindle itself, must be removed in order to withdraw the spindle through the steady-rest bearing.

Finally, it is specifically noted that in the drawings and foregoing description the cooperating pairs of elements numbered 28 and 29, and 28ª and 29ª, are disclosed as being square in cross-section. It is appreciated, however, that these elements could be made in a variety of cross-sectional shapes and be capable of accomplishing the same ends and purposes as the square sectioned elements as shown. The choice of a particular cross-sectional shape in any specific instance is considered to be well within the engineering skill of the art.

Moreover, while we have illustrated and described some preferred embodiments of this invention, it will be understood that other changes and modifications may be made in the details thereof without departing from the scope of the invention as limited only by the scope of the appended claims.

We claim:

1. A chuck assembly for use in association with a log peeling machine comprising: a rotary spindle; an axially projecting truncated pyramidal section mounted with the base of said section mounted on the base of said spindle; said section having a plurality of flat first faces; a boss of smaller cross-section than said pyramidal section extending axially from the face of the outer end of the pyramidal section; said boss having a plurality of flat second faces disposed in perpendicular alignment with respect to the plane of rotation of said rotary spindle; a face plate for mounting concentrically upon said section; said face plate having a central aperture formed with a plurality of first flat walls each disposed perpendicular to the broad faces of said plate and proportioned to snugly slidably telescope over a second face and having a plurality of second outwardly flared flat walls on the inner ends of said first walls; each of said second walls formed at an angle and proportioned to snugly slidably telescope over a first face in seating engagement therewith; and means carried by said spindle and loosely engaged with said face plate to loosely hold said face plate in seated position on said spindle.

2. The combination of claim 1 and wherein said means for loosely mounting said face plate on said spindle comprises: a threaded axial aperture formed in the outer face of said boss; a bolt having an enlarged head portion threadably engaged in said threaded aperture; a retainer plate rotatably mounted on said bolt and held against the end of said boss by the enlarged head of said bolt; and means to space said retainer plate in sufficient spaced relation with respect to said face plate to prevent tight engagement between said face plate and retainer plate.

3. The combination of claim 1 and wherein said means for loosely mounting said face plate on said spindle-supported adapter comprises: a pair of pin studs projecting from said face plate; and means for locking said pin studs into engagement with said spindle-supported adapter to loosely hold said face plate in engagement on said spindle-supported adapter.

References Cited in the file of this patent
UNITED STATES PATENTS

| Number | Name | Date |
|---|---|---|
| 1,398,020 | Holley | Nov. 22, 1921 |
| 2,442,714 | Stack | June 1, 1948 |

FOREIGN PATENTS

| Number | Country | Date |
|---|---|---|
| 161,028 | Great Britain | Apr. 7, 1921 |
| 678,885 | Great Britain | Sept. 10, 1952 |
| 1,024,014 | France | Jan. 7, 1953 |